United States Patent [19]

Moriya et al.

[11] Patent Number: 5,621,851
[45] Date of Patent: Apr. 15, 1997

[54] METHOD OF EXPANDING DIFFERENTIAL PCM DATA OF SPEECH SIGNALS

[75] Inventors: Toshio Moriya, Yokohama; Kunihiro Yanagi; Motoaki Satoyama, both of Sagamihara; Yoshihiro Mizuno, Daito, all of Japan

[73] Assignee: Hitachi, Ltd., Tokyo, Japan

[21] Appl. No.: 192,578

[22] Filed: Feb. 7, 1994

[30] Foreign Application Priority Data

Feb. 8, 1993 [JP] Japan .................................. 5-019887

[51] Int. Cl.$^6$ .............................. G10L 3/02; G10L 9/00
[52] U.S. Cl. .......................... 395/2.21; 395/2.1; 395/2.2
[58] Field of Search ............................ 349/50; 370/108; 381/37, 51; 395/2, 2.2, 2.21, 2.28, 2.35, 2.1

[56] References Cited

U.S. PATENT DOCUMENTS

| | | | |
|---|---|---|---|
| 4,680,797 | 7/1987 | Benke | 395/2.2 |
| 4,944,012 | 7/1990 | Morio et al. | 395/2.21 |
| 5,051,991 | 9/1991 | Szczutkowski | 370/108 |
| 5,083,310 | 1/1992 | Drory | 395/2.21 |
| 5,111,505 | 5/1992 | Kitoh et al. | 381/51 |
| 5,216,744 | 6/1993 | Alleyne et al. | 395/2 |
| 5,294,925 | 3/1994 | Akagiri | 341/50 |
| 5,327,520 | 7/1994 | Chen | 395/2.28 |
| 5,341,457 | 8/1994 | Hall, II et al. | 395/2.35 |

OTHER PUBLICATIONS

IEEE ICCC 84, "Prevention of Predictor Mistracking in ADPCM Coders", Millar et al, pp. 1508–1510.
Shoji et al, "A speech processing LSI for ATM network subscriber circuits"; 1990 IEEE International Symposium on Circuits and Systems, pp. 2897–2900 vol. 4, 1–3 May 1990.

Primary Examiner—Tariq R. Hafiz
Attorney, Agent, or Firm—Fay, Sharpe, Beall, Fagan, Minnich & McKee

[57] ABSTRACT

During expansion of differential pulse code modulation PCM data into (PCM) data, particularly for speech data in data processing, the range of oscillation of the PCM data can be centered about an amplitude level when each current PCM value has a small value Δ subtracted from it or added to it when respectively positive or negative to obtain a corrected current PCM sample value. Even if manipulation involved in data editing, such as division or connection, of differential or expanded PCM data has been performed or if an error has occurred during transmission of differential PCM data to produce an offset, such offset can be quickly corrected during the expansion.

36 Claims, 7 Drawing Sheets

METHOD OF EXPANDING DIFFERENTIAL PCM DATA OF SPEECH SIGNALS

BACKGROUND OF THE PRESENT INVENTION

The present invention relates to data processing, particularly to the correction of errors relating to compressed and expanded data. The present invention is particularly adapted to the digital compression and expansion of speech data, particularly wherein the speech data has been manipulated for example by cutting or pasting of portions thereof that tend to produce amplitude offset errors.

Pulse code modulation (PCM) is a common technique for digitizing speech by sampling the speech sound wave in its analog form and converting each sampling into a binary number, to produce digital data (PCM data). Commonly, this PCM data is edited, for example by cutting out portions to delete them or to paste portions at another location in the data, which is known as cutting and/or pasting of speech PCM data.

PCM data may be compressed, for efficiency of storage, transmission and the like by converting the PCM data into differences between adjacent samplings, rather than the value of the samplings themselves, which technique is known as differential compression. Differential speech PCM data, after storage or transmission, can be expanded into PCM data, which is particularly useful in a computer system having multimedia terminals.

A multimedia terminal can process speech signals or video signals with a computer or when connected by a communication network with a computer, which communication network usually transmits only digital signals. In general, speech data is converted into a digital form, digitally compressed, transmitted or stored, subjected to data processing (such as manipulation that includes editing functions such as cutting and/or pasting), and expanded from its compressed form after storage or transmission.

Various compression methods have been proposed and have been put into practice, and many of these compression methods utilize a differential PCM system employing differential processing. ADPCM (adaptive differential pulse code modulation) is a known differential PCM system that is currently used.

The present invention is usable with various forms of differential PCM that are available. A differential PCM system particularly adapted to the present invention compresses digital PCM data by taking the simple amplitude difference between a preceding PCM sample value and the current PCM sample value, and storing such difference with respect to each sample value, in succession. The data is thus compressed, because it takes considerably less memory to store each difference than to store each sample value.

In an effort to overcome the offset problem occurring in the expansion of data, it has been known to employ a CCITT-recommended ADPCM as described in "Prevention of Predictor Mistracking in ADPCM Coders", D. Millar and Mermelstein, IEEE ICCC 84. During the expansion in such a system, the following equation is employed for progressively neglecting old values based on previous sampling for the purpose of reducing reflection of error data value:

$$y(k)=(1-\epsilon)\cdot y(k-1)+E(k) \quad \text{(Number 1)}$$

where y(k): kth sample value;

$\epsilon$: constant to satisfy $0<\epsilon<<1$; and

E(k): kth difference (differential) signal.

With the above system, an error that occurs due to connection or division can be progressively reduced with time.

In another system for reducing an error caused by connection or division, upper and lower thresholds are set for the expanded data. Each time an expanded data sampling reaches either of the upper and lower thresholds, the current value of the expanded data is corrected so that the threshold is not exceeded, which correction will then be passed to all succeeding expanded data.

Another conventional way of coping with the above-mentioned problem associated with divisional connection, employs expansion of the entire compressed data before performing the connection or division, and then again compressing the entire data after the performance of such connection or division, thereby completely avoiding the problem.

SUMMARY

It is an object of the present invention to analyze conventional systems to identify problems, to analyze such problems as to their cause and effect, and to provide solutions to such problems.

The differential compression of PCM sample data is shown with respect to FIG. 2(a) and FIG. 2(b). In expanding the differential compressed data, the value of the preceding sample data is always important. If the value of the preceding PCM sample data is wrong for any reason, the next (current) PCM sample value calculated by adding the recorded difference to the preceding wrong PCM sample value will have a wrong value, as will all subsequent expanded PCM sample values. Since this wrong relationship continues, an offset remains in all the data following a single offset, i.e. wrong PCM sample value. For example, when expansion processing is performed by using differential PCM data, if 10 is an erroneous initial or preceding PCM sample value that should actually be 0, the subsequent expansion processing is performed to produce subsequent PCM values that are larger by 10 than their true values. This situation is illustrated in FIG. 3, which is constituted by FIG. 3(a) and FIG. 3(b). In FIG. 3(a) the analog waveform shown in dotted lines is sampled, digitized, quantized, and differential processed for storage of differential PCM data, as explained with respect to FIG. 2(a) and FIG. 2(b). If for some reason, the first sampling that should be 0 as shown in FIG. 3(a) is actually 10 when expanded, the expanded PCM data and reproduced analog waveform as shown FIG. 3(b) will be shifted, i.e. offset, in amplitude as compared to the true value shown in FIG. 3(a).

The above analyzed problem manifesting itself as an amplitude shift in the waveform or digital data can occur in a portion of compressed data, particularly differential PCM data, as caused by an error in one value occurring in a transmission line. If such an error is in a compressed-data sequence at one location, it is impossible, for the above-described reason, to perform correct expansion processing on that portion of the compressed-data sequence that follows the location of the error.

Another example of the occurrence of the problem involved in amplitude shifting the digital data and reproduced analog waveform involves the case where compressed digital data has been manipulated, for example where a portion of the data has been removed and the data preceding the removed portion now becomes adjacent the data following the removed portion at a connection (or division), or where new data has been pasted between adjacent values of compressed PCM data to form two connections, respectively before and after the pasted data. Also, if a mid-portion of compressed PCM data were expanded and the last sample changed (by cutting end samplings, e.g.) in editing or manipulating and then such edited or manipulated PCM data were compressed, an offset would occur.

In these examples, the differential PCM data value immediately following such a connection is stored or transmitted as a difference from the value of the PCM data preceding it, but now because of such connection, there is a different value for the preceding data sample. Therefore, when the differential PCM data value following a connection is expanded, it will be expanded to a false value, and all subsequent differential PCM data will be expanded to false PCM data values since it is based upon the value of preceding expanded PCM data.

The alternating-current component of a waveform represents speech in the preferred example, and the direct-current component of the waveform may be neglected when the speech signal is output to a speaker or otherwise used in an analog form. Accordingly, if the waveform as a whole is displaced in a direction parallel to the amplitude thereof, the quality of sound which can be heard substantially does not vary. If a waveform of speech is to be displayed in the performance of editing the corresponding speech data on a computer, it is preferable to display the waveform in such a manner as to oscillate the waveform equally above and below an amplitude level of 0.

There are a number of disadvantages associated with the above-described prior art involving shaping the waveform of PCM data obtained by performing connection or division of the differential PCM data and expanding the resulted PCM data into the above-described waveform.

The CCITT-recommended system has a problem of increasing the number of calculations required for both the expansion and the compression, and therefore increasing the complexity of the expansion and compression processing. In addition, expansion is performed by the system, so that compression using the system also needs to be performed, therefore no existing compressed data can be utilized.

The above-described conventional converging of expanded data into a predetermined range by setting upper and lower thresholds for the expanded data has the problem that the operation of approaching an appropriate value is not performed until there occurs a particular sampling that has a data value that exceeds either of the thresholds.

With respect to the conventional method of expanding all of the compressed data prior to performing manipulation, such as resulting in connection or division, and thereafter compressing the data obtained by such manipulation has the problem that the amount of data to be compressed and expanded remarkably increases and the time required for the entire editing processing correspondingly increases.

It is an object of the present invention to provide a desired PCM data sequence while suppressing the above-described problems.

According to the present invention, when the original PCM data sample sequence is to be obtained from a differential PCM data sequence that was formed by recording the differences between adjacent PCM sample values, first of all, the initial value of the PCM sample sequence is set to 0, and then a fixed value is selected and set as a correction constant $\Delta$, which fixed value is selected to be sufficiently small when compared to the expected range of PCM sample values that its production of granular noise can be neglected. The desired sample expanded PCM data is obtained in sequence by repeating the steps of adding differential PCM data to the preceding PCM data sample value and, if the obtained value is positive, subtracting $\Delta$ from the obtained value and setting the resultant value as the current PCM value, or, if the obtained value is negative, adding $\Delta$ to the obtained value and setting the resultant value as the current PCM sample value.

In the present invention, if the current PCM data sample value obtained by adding the recorded differential PCM data value to the preceding PCM data sample value is positive, then the entire waveform for the current PCM data sample value and subsequent values is displaced as a whole in the negative direction by the subtracting of the correction constant $\Delta$ from the current PCM data value, whereas if the current PCM data value obtained by adding the recorded differential value to the preceding PCM value is negative, then the entire waveform for such current and subsequent PCM data values is displaced by the correction constant $\Delta$ in the positive direction by adding the correction constant $\Delta$ to the current PCM data value. Thus, for each sample value, the entire waveform from that value and subsequent values is corrected so that the 0-axis of amplitude progressively approaches the center of the waveform. That is, the correction is performed for each PCM value.

BRIEF DESCRIPTION OF THE DRAWING

Further objects, features and advantages of the present invention will become more clear from the following description of a preferred embodiment, as shown in the accompanying drawing, wherein.

DETAILED DESCRIPTION OF THE PREFERRED EMBODIMENT

The storing of input speech as differential PCM data will be described first.

Figure 2A:
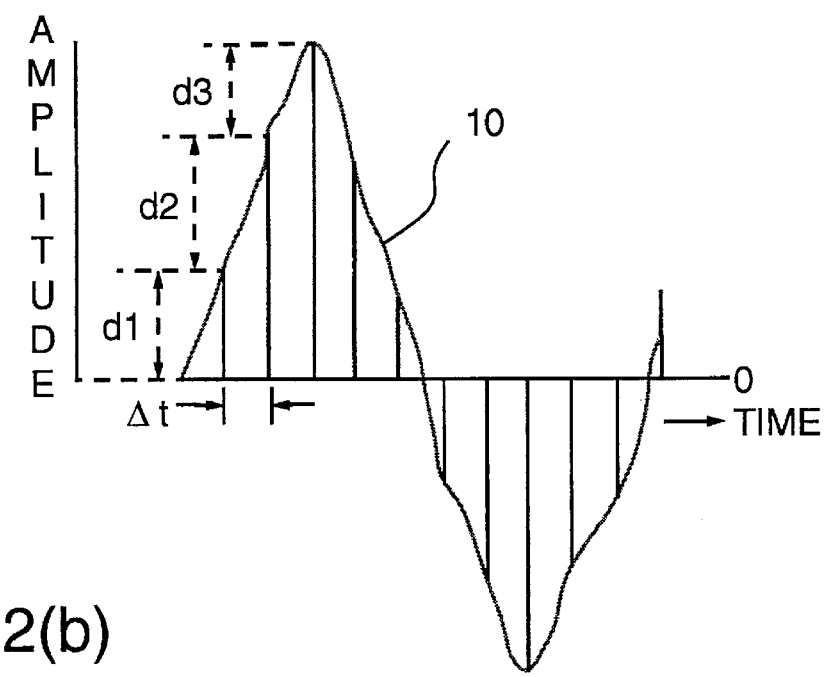
FIG. 2(a) and FIG. 2(b) respectively show, for analysis, the conversion of an analog waveform to PCM data and corresponding differential PCM data, which is a part of the present invention.
Figure 2B:
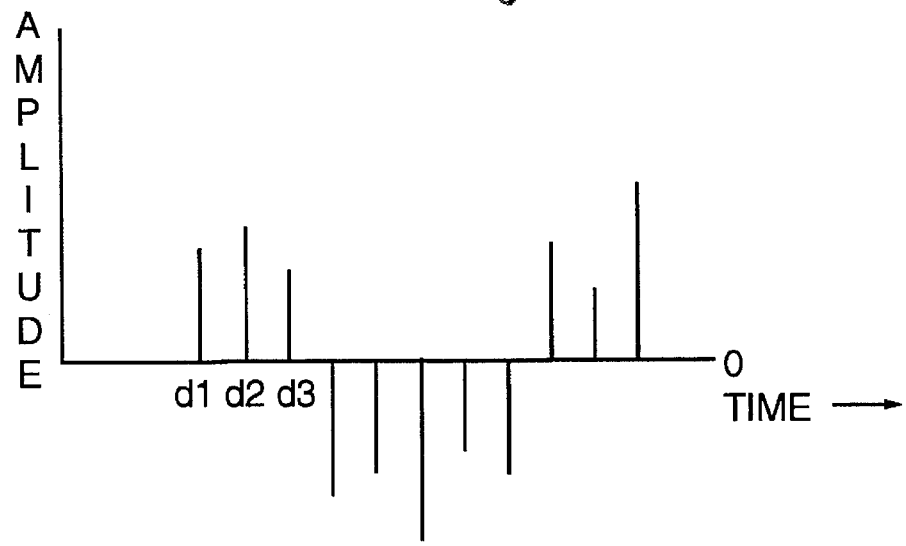
Figure 3A:
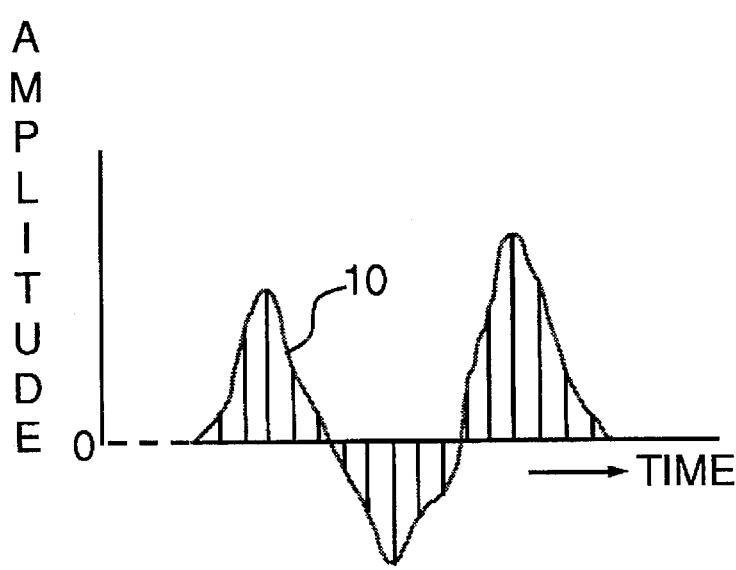
FIG. 3(a) shows an example of a waveform shown in EFIG. 2(a)
Figure 3B:
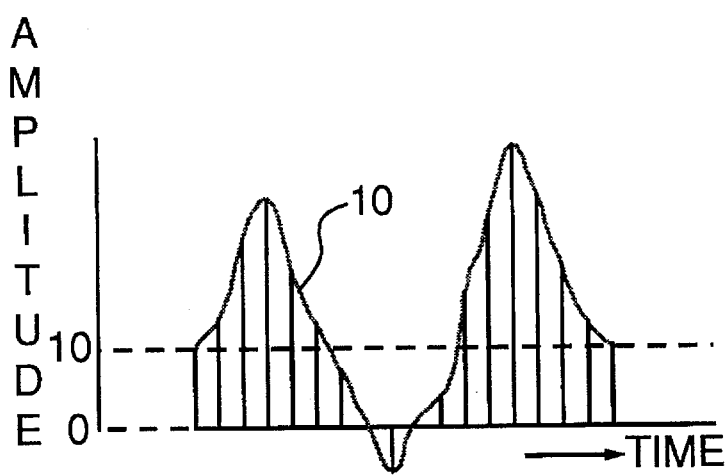
FIG. 3(b) shows the waveform of FIG. 3(a) offset in amplitude, which involves analysis useful in explaining the principles of the present invention.

FIG. 2 is useful for explaining the differential compression of PCM data. FIG. 2 consists of FIG. 2(a) and FIG. 2(b). The dotted line shown in FIG. 2(a) is an analog waveform of an input speech signal (for example the signal sent from the microphone 510 to the A/D converter 210 of FIG. 6). The input speech signal 10 is sampled at a sampling frequency having a period at by the A/D converter 210 to produce digital data of a succession or sequence of digital sample values represented by the vertical solid lines in FIG. 2(a). This digital sampling data is then output from the A/D converter 210 to the quantizer 230, wherein it is quantized, that is the digital output of the A/D converter for each sampling is given one of a fixed plurality of digital values within a fixed digital range to obtain the PCM digital data (for example, the digital range may be plus, minus the digital values represented by fourteen significant bits in a binary system).

The thus quantized data, represented by the solid lines in FIG. 2(a) is also referred to as expanded PCM data, to contrast it with compressed data. In the preferred embodiment, the expanded PCM data is represented in 14-bit form, which is generally widely used. The PCM data is compressed by differential processing in the data compressor 250, resulting in corresponding differential compressed PCM data represented in FIG. 2(b). The difference between each sample value of the PCM data and the preceding sample value, as shown in FIG. 2(a) as d1, d2, d3, etc., is obtained as the differential compressed PCM data of FIG. 2(b) as the output of the data compressor 250. Since the first sample value of the PCM data has no preceding sample value, the differential value is determined on the assumption of a preceding sample value of 0.

In the example of FIG. 2(a), the first sampling is when the analog waveform has a digital value of zero, so that the first difference d1 between adjacent sampling has a value as shown in FIG. 2(b); the second difference d2 between adjacent waveforms is obtained from the data represented in FIG. 2(a) and is shown in FIG. 2(b). Similarly, the remaining differences d3, etc., are obtained. It is the differences of FIG. 2(b) that are the compressed data and which are transmitted, stored or the like. That is, in the difference processing, the difference between a preceding PCM sample value and the current PCM sample value is obtained and this difference value is stored or transmitted, thereby decreasing the number of quantization bits. In the case of expansion, the current PCM sample value is obtained by adding the stored difference value to the preceding PCM sample value. The differential compressed PCM data is stored in a compressed data storage 410 as speech compressed data. The compressed data storage 410 may be a magnetic disk array, or the like permanent storage.

Figure 6:
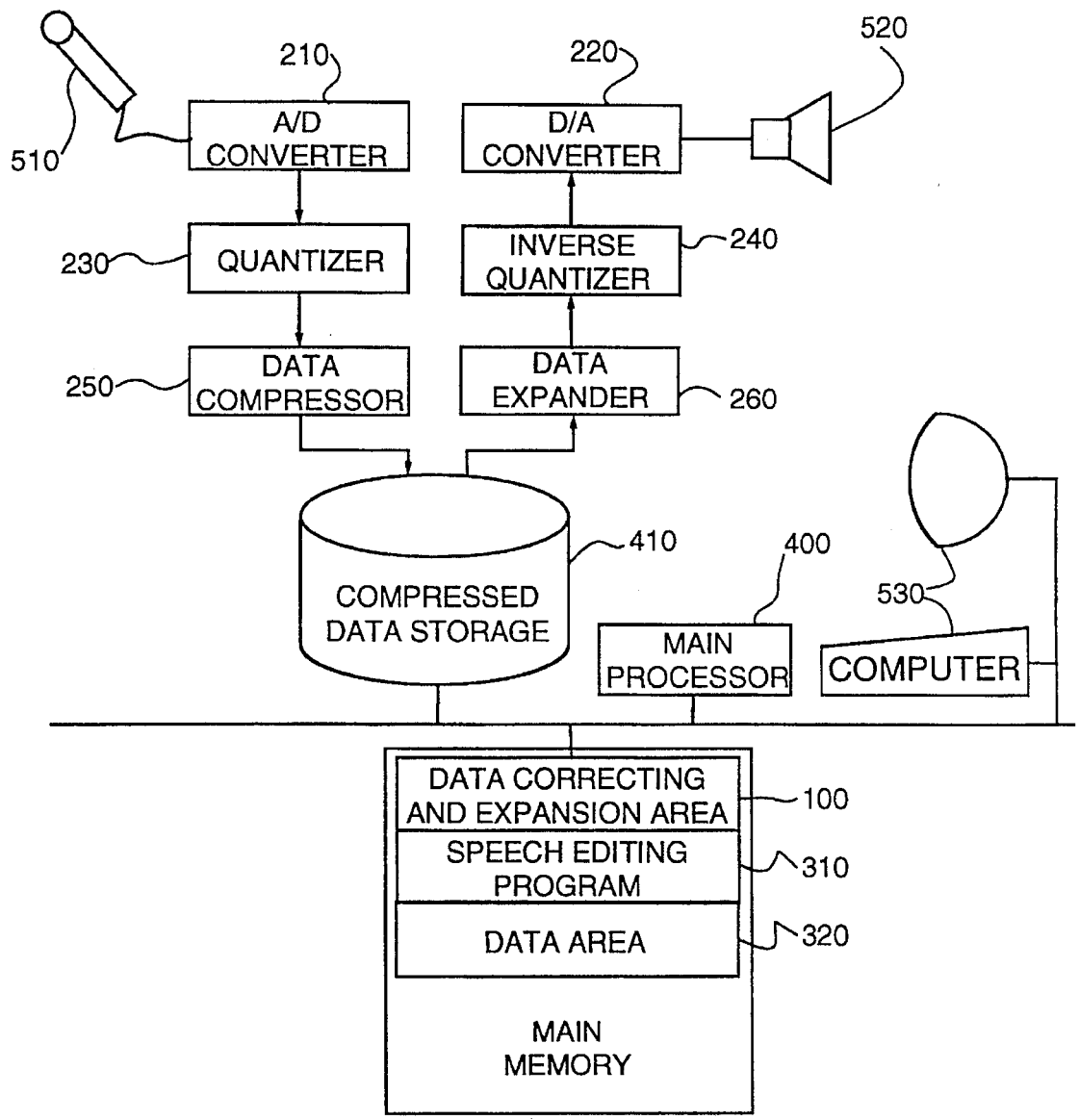
FIG. 6 shows a data processing system according to the present invention.

In FIG. 6, the components 510, 210, 230, 250 and 410, as described so far, are conventional and their functioning described to date in the present system is also conventional.

The editing of speech data will be described below. Arbitrary speech differential PCM data are retrieved from the plurality of speech differential PCM data stored in the compressed data storage 410, and desired speech data is created by performing data manipulation, such as cutting and pasting of data portions, which creates connections or divisions of the speech data retrieved from the compressed data storage 410. In the present invention, this data manipulation or editing is performed with the speech data in compressed form as differential PCM data, and after such editing the differential compressed speech data is stored in the compressed data storage 410. Also the editing may be performed without expanding and subsequently compressing the entire speech data, although portions of the speech data may be expanded, edited and compressed during the editing process. The editing is controlled by commands that are a part of the speech editing program 310 in the main memory of the speech data processing system of FIG. 6.

During the editing, the speech editing program 310 is run on a main processor 400 with the aid of a display device and input device collectively shown as a data terminal or computer 530. The components 530, 400, 410 and main memory are interconnected for the transfer of address signals, control signals and data by a common bus, as shown. During the editing, data is temporarily stored in data area 320 of the main memory. The structure and functions of the speech editing program 310, data area 320, main processor 400 and terminal 530 for editing are conventional and therefore will not be described in detail.

Figure 4A:
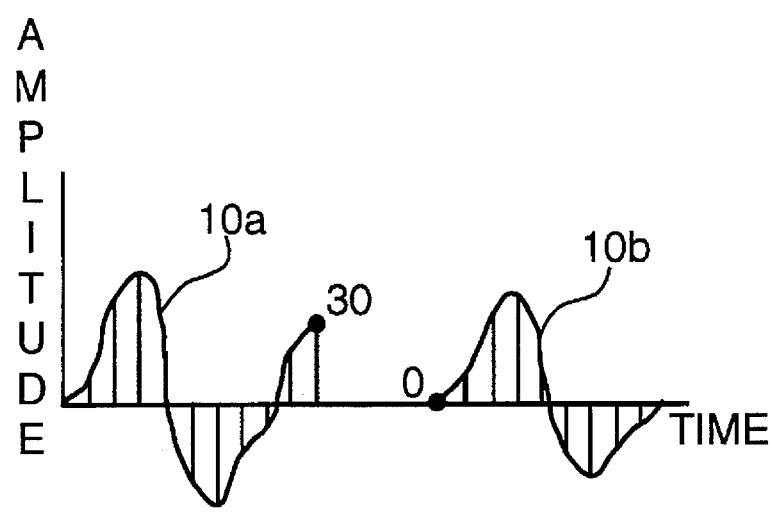
FIG. 4(a) shows two edited waveform portions, before their connection in FIG. 4(b), which involves analysis useful in explaining the principles of the present invention.
Figure 4B:
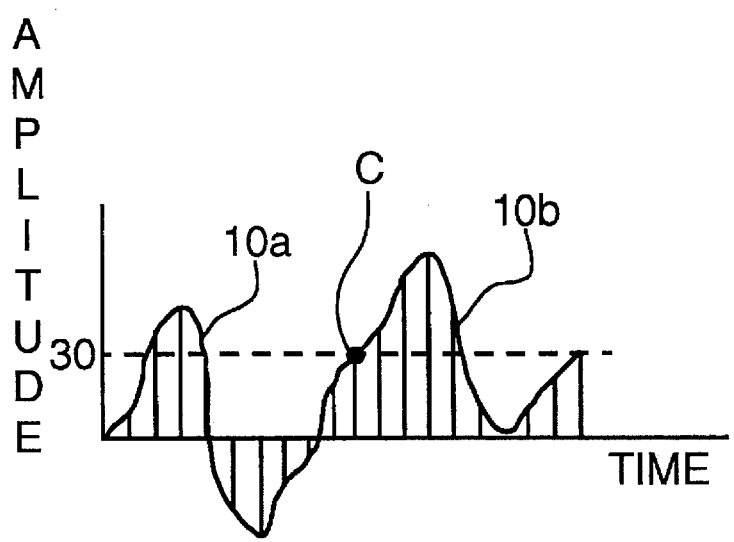

FIG. 4(a) and FIG. 4(b) are useful in explaining how erroneous expanded data will follow a connection. FIG. 4(a) shows a first portion of compressed PCM data 10b whose initial value is 0 and a second portion of compressed PCM data whose PCM terminal value is 30. If these two portions, not connected in FIG. 4(a), are connected in FIG. 4(b) through data manipulation as a part of editing, for example, the compressed PCM data portion 10b will then immediately follow the compressed PCM data portion 10a. Because of the connection C the compressed PCM and data portion 10b and all subsequent data will be offset by a value of 30 in its entirety. Thus, when the compressed PCM data is expanded and converted into an analog waveform, the waveform shown in dotted lines in FIG. 4(b), the waveform will be inaccurate following the connection C.

In the case of forming a connection C shown in FIG. 4(b), a binary data sequence is cut somewhere between its opposed ends to form two files. In the above-described process, it is preferable to simplify the entire operation required to edit speech data, by editing the compressed data without expanding the compressed data, and the preferred embodiment of the present invention does not expand the compressed data during editing, although the broader aspects of the present invention are also applicable to expanding a mid portion of the compressed data which is actually being edited and then compressing the edited data, without requiring expansion of all compressed data following the data edited.

The process of reproducing the analog speech signal from the stored differential PCM data will now be described with respect to FIG. 6.

The differential PCM data stored in the compressed data storage 410 is retrieved and then expanded in the data expander 260 in a known manner by adding each differential PCM data value of the current sampling to the PCM data value of the preceding sampling. The thus obtained PCM data is converted into an analog speech signal by passing through the inverse-quantizer 240 and the D/A converter 220, and the analog speech signal is output from the D/A converter 220 to a speaker 520 as an example of an output device. The operation of the output device 520, the D/A converter 220, the inverse-quantizer 240 and the data expander 260 (as described to date) are conventional and therefore will be not explained in detail further.

However, the data expander 260 includes additional processing not found in the conventional data expander, which will be described in detail as follows. First of all, a general expansion of the data as performed by the data expander 260 will be described according to the present invention. In the general expansion, the current value of the differential PCM data is added to the preceding PCM data sample value to obtain the current PCM data sample value. Since there is no preceding PCM data sample value for the first PCM data sample value, the first PCM data sample value is obtained on the assumption that the preceding PCM data sample value was 0. The function of the data expander 260 explained to this point is conventional.

The conventional data expander does not output data with the offset problems discussed above when it is only expanding conventional differential PCM data which has not been edited and which has not picked up an error for some other reason, such as during transmission. However, in the case of differential PCM data that has been subjected to editing where a connection or division has been formed or with respect to differential PCM data that has one of its values changed to be erroneous during transmission, for example from a remote data processing system, the waveform produced is displaced at the point of connection or division or error and subsequently in time thereto in a direction parallel to the amplitude of the waveform. This is due to the single inaccurate value of the differential PCM data for the sampling immediately following the point of connection or division or at the point of error, as previously described with respect to problems involving the prior art.

The present invention solves the above-described problem by applying correction processing to the above-described general expansion, that is by applying correction processing in addition to and without otherwise changing the above-described general expansion, in accordance with the data expander 260 of the present invention under control of the data correcting and expansion program 100 held in the main memory.

Figure 1:
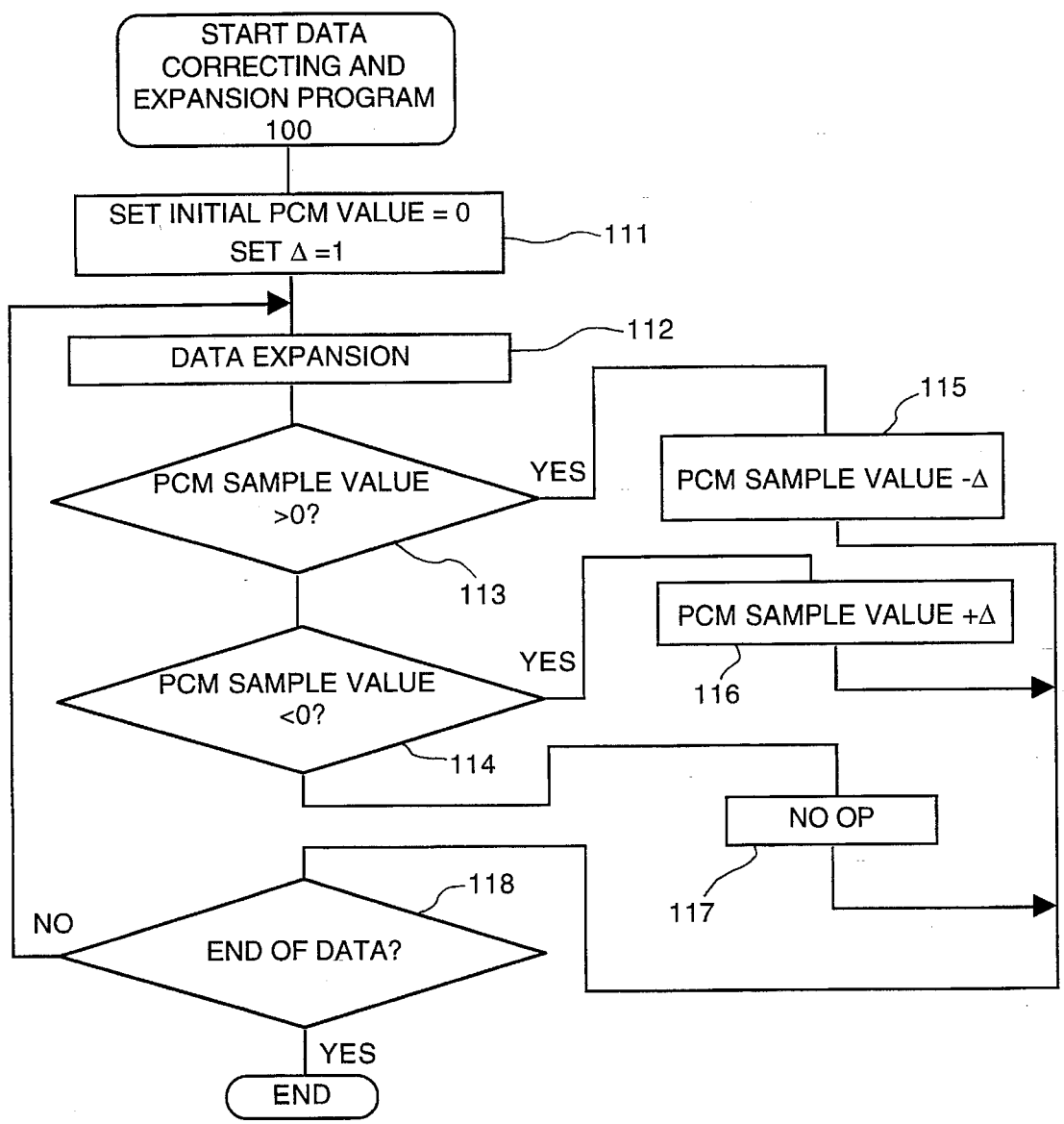
FIG. 1 is a flowchart showing the expansion and data correction according to the present invention.

FIG. 1 is a flowchart showing the running of the data correcting and expansion program 100. In step 111, the initial PCM data value is set to a fixed value, for example 0, and the correction value $\Delta$ is set to a fixed value, for example 1, each of which may be a selected value that is automatically selected based upon some criteria or manually selected. The correction value $\Delta$ may be a value relatively small as compared to the range of values expected for PCM data sample values such that granular noise produced thereby is negligible as compared to the quality of the sound produced. As an example, the PCM data is represented by 14-bits, so that the value of the PCM data ranges between +16,000 and about −16,000, so that a fixed value of 1 for $\Delta$ is a negligibly small value with respect to the total range of 32,000 for the PCM data.

Thereafter, the conventional expanding of differential PCM data is performed with step 112. That is, the current PCM data sample value is obtained by adding the current differential PCM data value to the preceding PCM data sample value.

Thereafter, step 113 determines if the current PCM data sample value is greater than 0, and if greater than 0, then processing proceeds to step 115, otherwise processing proceeds to step 114. In step 115, the fixed value of $\Delta$ is subtracted from the current PCM data sample value to obtain a new current PCM data sample value and thereafter processing proceeds to step 118. If step 114 determines that the current PCM data sample value is less than 0, processing proceeds to step 116, otherwise processing proceeds to step 117. In step 116, the fixed value of $\Delta$ is added to the current PCM data sample value to obtain a new current PCM data sample value, which is then output to step 118. In step 117, neither subtraction nor addition of the fixed value $\Delta$ is performed, that is step 117 is a "no-operation" or "no-op", and then processing proceeds from step 117 to step 118. In step 118, a judgment is made as to whether or not all of the differential PCM data has been expanded, and if it has not been expanded, processing is returned to step 112 to expand the next value of differential PCM data, and if all of the differential PCM data has been expanded, then the processing of the expansion program 100 is ended.

Steps 113 and 114 may compare a previous PCM data sampling to the threshold instead of comparing the current PCM data value, and with such a modification, steps 113 and 114 could be conducted in parallel with step 112, i.e. at the same time. Also steps 115 and 116 may use multiplication instead of addition, e.g. $\Delta$ may be 1.0001 in step 116 and 0.9999 in step 115.

Figure 5A:
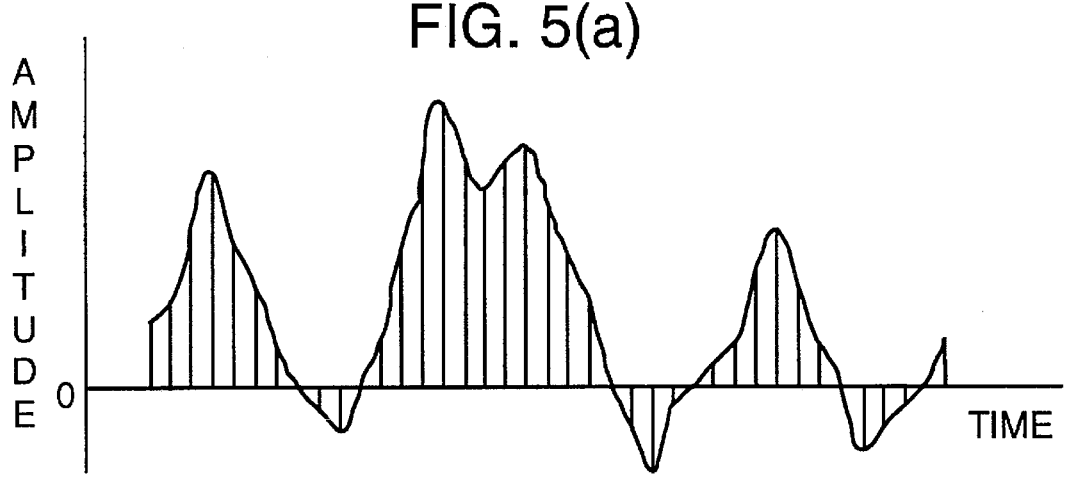
FIGS. 5(a), 5(b) and 5(c) show how the number of positive and negative PCM data sample values occurring for the same waveform are varied when the entire waveform is displaced or offset in a direction parallel to the direction of amplitude of the waveform, which is useful in explaining the principles of the present invention.
Figure 5B:
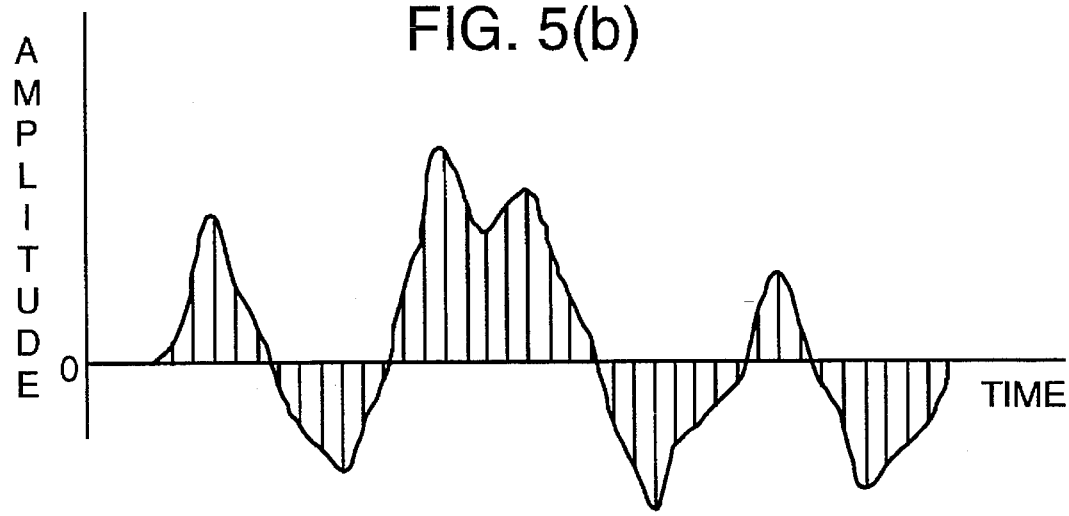
Figure 5C:
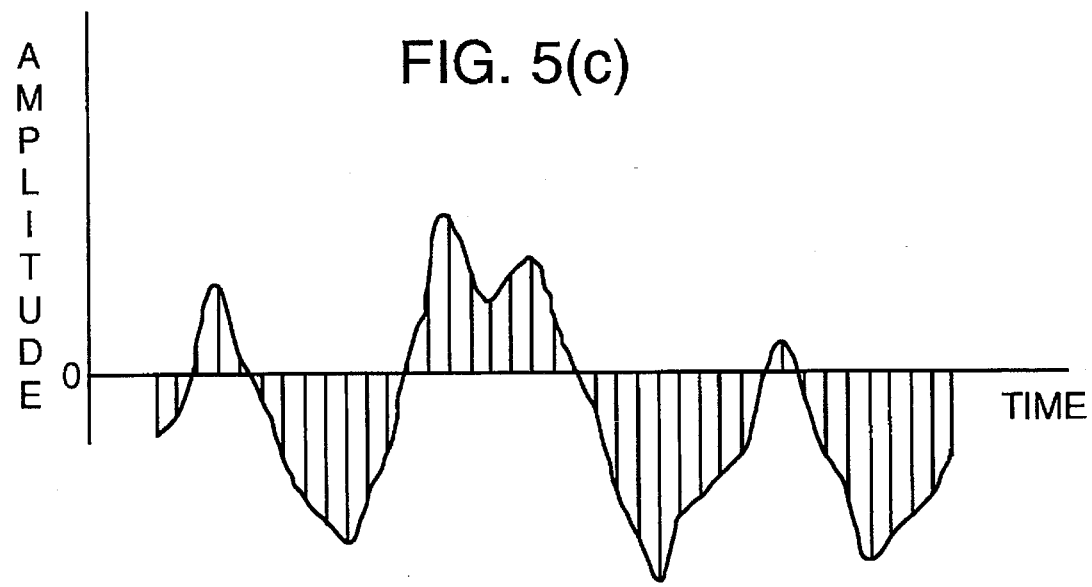

FIG. 5(*b*) shows an example of a digitized speech waveform represented with the 0 amplitude base line passing through a neutral horizontal axis representing an average neutral or zero amplitude for the waveform, that is with the number of positive samplings being equal to the number of negative samplings, which may be considered an accurate representation of normal PCM data for purposes of analysis. FIG. 5(*a*) shows the waveform of FIG. 5(*b*) displaced in the positive direction, while FIG. 5(*c*) shows the FIG. 5(*b*) waveform displaced in the negative direction, which displacements may be caused by the above-described offset produced due to a data processing manipulation of editing involving a connection or division, or an error introduced during transmission of the differential PCM data. Since the waveforms shown in FIGS. 5(*a*) and 5(*c*) are offset with respect to the normal waveform of FIG. 5(*b*) preceding the transmission error or preceding the connection or division, the waveforms shown in FIGS. 5(*a*) and 5(*c*) are in error and will produce a distorted reproduction if not corrected in accordance with the present invention.

Figure 7:
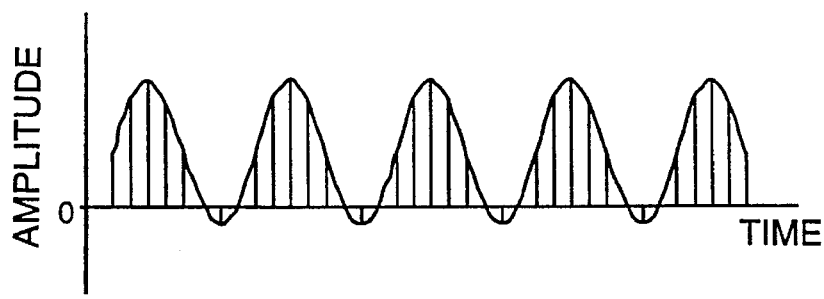
FIG. 7 shows an example of offset PCM data expanded by a general expansion method, which is useful in understanding the principles of the present invention.
Figure 8:
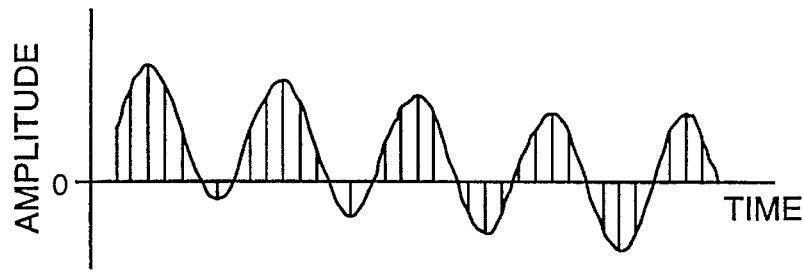
FIG. 8 illustrates the manner in which offset data that produced the waveform shown in FIG. 7 may be corrected according to the present invention to correct the waveform by expanding the same differential PCM data that was expanded to obtain FIG. 7, but with the progressive correction of the present invention.
Figure 9:
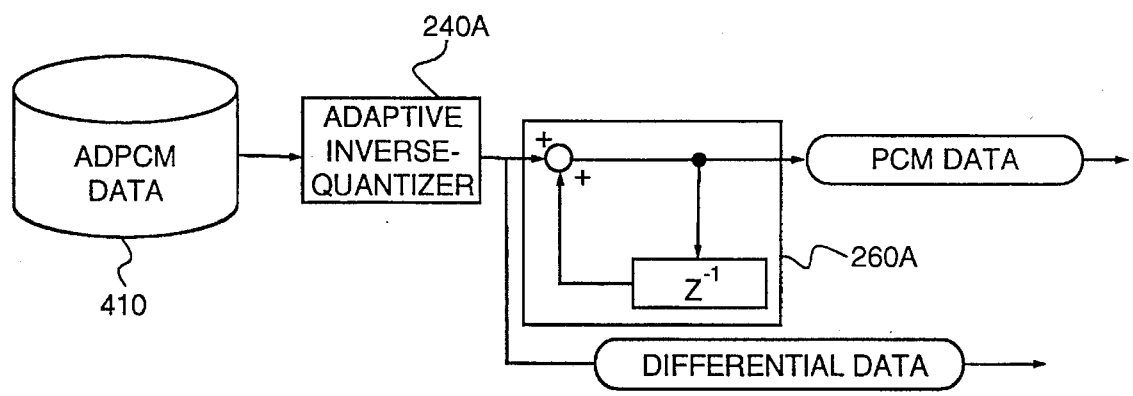
FIG. 9 is a block diagram of an ADPCM expander that may be used with the present invention.

FIG. 7 represents offset sample values of PCM data that would be produced if the processing of FIG. 1 always directly proceeded from step 112 to step 118, that is without intervening steps 113–117, for a specific example. It is seen that the waveform of FIG. 7 is in error by being offset from a correct 0 base line waveform (such as that shown for example in FIG. 5(*b*)), which offset is in the positive direction of FIG. 5(*a*). In FIG. 9, there is shown what happens when the same PCM data that would produce a waveform as shown in FIG. 8, additionally has been corrected in accordance with steps 113–117 of FIG. 1 in accordance with the present invention starting with the first PCM data sample value, that is the leftmost PCM data sample value shown in the figure. It can be seen that after a relatively small number of PCM data sample values (and an accumulated total shifting of $\Delta$ times such number), the waveform has been corrected, that is the waveform has been corrected to have its amplitude centered on the 0 amplitude base line.

Although the present embodiment has been described with respect to general differential PCM data employed as an example of the compressed data, the present invention is also applicable to expanding ADPCM data, and with such ADPCM data all of the above-described steps and structure are applicable, except as follows. ADPCM data is intended to improve the sound quality of speech and enhance the compression ratio by performing adaptive-quantization of differential data obtained through differential processing. FIG. 9 is a block diagram of an ADPCM data expanding part, which would replace the correspondingly numbered components of FIG. 6 and accordingly need revision of the data correcting and expansion program 100 of the present invention, when the present invention is applied to ADPCM compressed data. Thereby, it is possible to achieve similar advantages as described above by applying the present invention to differential PCM data and ADPCM compressed data. FIG. 9 shows an expansion process inputting ADPCM data from file 410 to an adaptive inverse-quantizer 240A to output differential data, which is then subjected to the illustrated processing in data expander 260A to produce the PCM data, in a known manner according to the known expansion of ADPCM data and with the addition of correction according to the present invention in steps 113–117, that is the processing and structure of FIG. 9 would be conducted according to steps 112–117 during the expansion of ADPCM compressed data.

Although the present preferred embodiment has been described to employ correction processing in accordance with steps 113–117 for each sampling of PCM data, the correction processing of steps 113–117 may be bypassed when it is determined that the waveform has been substantially corrected to the desired waveform. More specifically, the processing of FIG. 1 may be conducted on some samples (several thousands to several tens of thousands of samples) starting at a portion involving an offset, that is starting at a connection or division point or starting at a point where a transmission error has occurred, and then the general expansion method including no correction processing, that is bypassing steps 113–117, may thereafter be performed; this can be accomplished by simply adding a counter to the line between step 118 and step 112, to effectively switch the processing from step 112 directly to the step 118 when a predetermined count has been reached following the detection of an offset. The counter is reset each time an offset is determined, for example an offset is determined when: editing or manipulation has produced a connection or division; or a positive shift counter has a count that differs by a fixed amount from a negative shift counter, each counter counting the number of samplings out of the last one thousand samplings e.g., that are respectively positive or negative.

Also, the value of the fixed correction Δ may be set to a sufficiently large value that the correction process can be rapidly performed at the expense of a certain deterioration in sound quality (noise) during an initial period of the correction processing, and as the correction processing proceeds, the value of Δ may be gradually made smaller, again based upon counting the number of iterations of steps 112–118 following a determination of an offset or following the last change of Δ, whereby it is possible to increase the speed of convergence of the waveform and 0 axis base line to a correction position. For example, 3 may be initially set as the value of Δ for the first 1,000 samples following an offset, thereafter 2 may be set as the value of Δ for the next 2,000 samples and thereafter 1 may be set as the value of Δ for the subsequent 1,000 samples.

By employing the differential PCM data expanding according to the present invention, it is possible to progressively correct, while performing expansion, an offset that has occurred, for example due to dividing or connecting, or due to the introduction of an error during transmission of differential PCM data over transmission lines.

Since the present invention relates to expansion of previously compressed data for data processing and handling, data previously compressed by conventional compression methods can be directly employed with the present invention.

Further, according to the present invention, only a small amount of an additional processing is added to the conventional expansion processing, so that the total processing complexity and time for performance of the expansion processing is similar to that of the conventional expansion processing, and the present invention has the advantage over the conventional expansion processing that error of an offset occurring as a result of a connection or division caused by previous editing or as a result of data alteration caused during transmission of differential compressed data is avoided.

While a preferred embodiment has been set forth with specific details, further embodiments, modifications and variations are contemplated according to the broader aspects of the present invention, all as determined by the spirit and scope of the following claims.

We claim:

1. A data processing method for correcting errors relating to expansion of compressed data, comprising the steps of:

a) inputting a plurality of differential compressed data in sequence on a sample by sample basis;

b) inputting an initial expanded data;

c) setting a correction value Δ;

d) for one sample of the differential compressed data, executing one iteration comprising
        expanding the one sample of the differential compressed data to a current sample of expanded data and
        adding the current sample of expanded data to the initial expanded data; and e) thereafter repeating the iteration in the sequence on at least one of the remaining samples so that said adding adds a next sample of the differential compressed data to a preceding current sample of expanded data to obtain a new current sample of expanded data, and for each iteration correcting the correction value Δ to the new current sample of expanded data for decreasing the new current sample of expanded data when the expanded data is greater in amplitude than a first threshold value and for increasing the new current sample of expanded data when the expanded data is less in amplitude than a second threshold value to obtain a corrected current sample of expanded data to be used as the preceding current sample for a next iteration.

2. The method according to claim 1, wherein said step (e) is performed with the first and second threshold values being equal.

3. The method according to claim 1, wherein said step (e) is performed with said first threshold value being greater or equal to the second threshold value.

4. The method according to claim 1, wherein said step (c) of setting the correction value Δ is in response to a determination of an offset caused, for example, by an error in transmission of a differential compressed data or a connection point or a division point resulting from editing the differential compressed data.

5. The method according to claim 4, wherein said step (c) includes reducing the correction value Δ after a predetermined number of the iterations from the determination of an offset.

6. The method according to claim 4, further including effectively bypassing said step (e) for at least one of the iterations.

7. The method according to claim 6, wherein said bypassing includes setting the correction value Δ to 0 after a predetermined number of iterations from the determination of an offset.

8. The method according to claim 4, wherein said step (c) sets the correction value Δ to a value that produces negligible granular noise as compared to a range of values for the expanded data.

9. The method according to claim 1, further including prior to the step (a) the preliminary step of transmitting the differential compressed data and producing an offset error in the differential compressed data due to a transmission error, and conducting said step (e) only in response to determining the error.

10. The method according to claim 1, further including prior to the step (a) the preliminary step of editing to produce a connection or division point that produces an offset error in the data, and conducting said step (e) only in response to determining the error.

11. The data method according to claim 1, said iteration is performed with respect to adaptive differential pulse code modulation (ADPCM) data.

12. The data method according to claim 1, said iteration is performed with respect to pulse code modulation (PCM) data.

13. The method according to claim 1, wherein each iteration further includes the steps of thereafter inverse-quantizing the expanded data to produce quantized data, and digital/analog converting the quantized data to output analog data.

14. The method according to claim 1, said iteration is performed with respect to speech data.

15. The method according to claim 1, wherein said step (e) includes comparing the new current sample of expanded data to the first and second threshold values.

16. The method according to claim 1, wherein said step (e) includes one of subtracting and adding the correction value Δ.

17. The method according to claim 1, wherein said step (e) includes multiplying with the correction value Δ.

18. The method according to claim 1, wherein said step (c) sets the correction value Δ to a value that produces negligible granular noise as compared to a range of values for the expanded data.

19. The method according to claim 18, said iteration is performed with respect to pulse code modulation (PCM) data.

20. The method according to claim 18, said iteration is performed with respect to speech data.

21. The method according to claim 1, including determining the presence or absence of an offset error for each iteration and conducting said step (e) only for a predetermined number of iterations following determination of the offset error.

22. The method according to claim 21, wherein said step (c) of setting the correction value Δ is in response to determination of an offset caused, for example, by an error in transmission of a differential compressed data or a connection point or a division point resulting from editing the differential compressed data.

23. The method according to claim 22, wherein said step (c) includes reducing the correction value Δ after a predetermined number of the iterations from the determination of an offset.

24. The method according to claim 23, wherein said step (c) sets the correction value Δ to a value that produces negligible granular noise as compared to a range of values for the expanded data.

25. The method according to claim 22, wherein said step (c) sets the correction value Δ to a value that produces negligible granular noise as compared to a range of values for the expanded data.

26. The method according to claim 21, said iteration is performed with respect to pulse code modulation (PCM) data.

27. The method according to claim 21, said iteration is performed with respect to speech data.

28. A data processing method for correcting errors relating to expansion of compressed data, comprising the steps of:
  a) expanding a current sample of a differential data to obtain a new current sample of expanded data, by adding the current sample of the differential compressed data to a preceding current sample of expanded data;
  b) generating a corrected current sample of expanded data, by subtracting a correction value Δ from the new current sample of expanded data when the new current sample of expanded data is positive in amplitude;
  c) generating the corrected current sample of expanded data by adding the correction value Δ to the new current sample of expanded data when the new current sample of expanded data is negative in amplitude; and
  d) repeating the steps a) to c) by using the corrected current sample as the preceding current sample.

29. The method according to claim 28, further including prior to the step (a) the preliminary step of transmitting the differential compressed data and producing an offset error in the differential compressed data due to a transmission error, and conducting said steps (b) and (c) only in response to determining the error.

30. The method according to claim 28, further including prior to the step (a) the preliminary step of editing to produce a connection or division point that produces an offset error in the data, and conducting said steps (b) and (c) only in response to determining the error.

31. The method according to claim 28, wherein the data is adaptive differential pulse code modulation (ADPCM) data.

32. The method according to claim 28, wherein the data is pulse code modulation (PCM) data.

33. The method according to claim 28, wherein the data is speech data.

34. The method according to claim 28, wherein the correction value Δ is determined in response to an offset which is caused by an error in transmission, the differential compressed data or from a connection point or a division point resulting from editing the differential compressed data.

35. The method according to claim 28, wherein the correction value Δ is selected to produce negligible granular noise as compared to a range of values covered by the expanded data.

36. A data processing apparatus for correcting errors relating to expansion of compressed data, comprising:
  means for expanding a current sample of a differential data to obtain a new current sample of expanded data, wherein said means for expanding includes means for adding the current sample of the differential compressed data to a preceding current sample of expanded data;
  subtraction means for generating a corrected current sample of expanded data by subtracting a correction value Δ from the new current sample of expanded data when the new current sample of expanded data is positive in amplitude; and
  addition means for generating the corrected current sample of expanded data by adding the correction value Δ to the new current sample of expanded data when the new current sample of expanded data is negative in amplitude.

* * * * *